United States Patent [19]
Eastman et al.

[11] B 3,988,073
[45] Oct. 26, 1976

[54] SPHERICAL BIFILAR TUNING PIN BUSHING

[75] Inventors: Larry B. Eastman, Milford; Irwin J. Kenigsberg, Trumbull, both of Conn.

[73] Assignee: United Technologies Corporation, Hartford, Conn.

[22] Filed: Apr. 11, 1975

[21] Appl. No.: 567,158

[44] Published under the second Trial Voluntary Protest Program on March 23, 1976 as document No. B 567,158.

[52] U.S. Cl. ............................ 416/145; 74/574; 416/500
[51] Int. Cl.² ........................................ B64C 27/32
[58] Field of Search ............ 416/144, 145, 500; 74/573, 574

[56] References Cited
UNITED STATES PATENTS

| | | |
|---|---|---|
| 3,372,758 | 3/1968 | Jenney ........................... 416/500 X |
| 3,540,809 | 11/1970 | Paul et al. ...................... 416/500 X |
| 3,874,818 | 4/1975 | Saunders et al. ................ 416/144 |
| 3,887,296 | 6/1975 | Mills et al. ..................... 416/145 |

Primary Examiner—Everette A. Powell, Jr.
Attorney, Agent, or Firm—Maurice B. Tasker

[57] ABSTRACT

A multibladed helicopter rotor carries at least three bifilar absorbers which are tuned to eliminate in-plane vibrations of the rotor which otherwise would be transmitted to the helicopter fuselage. Improved tuning pin assemblies and cooperating tracking inserts for the absorber reduce the undesirable frictional damping heretofore encountered in bifilar absorbers by centering the pendulous elements of the absorbers relative to their support members and reacting forces normal to centrifugal force by permitting flapping movement of the bifilar mass in the vertical plane.

13 Claims, 4 Drawing Figures

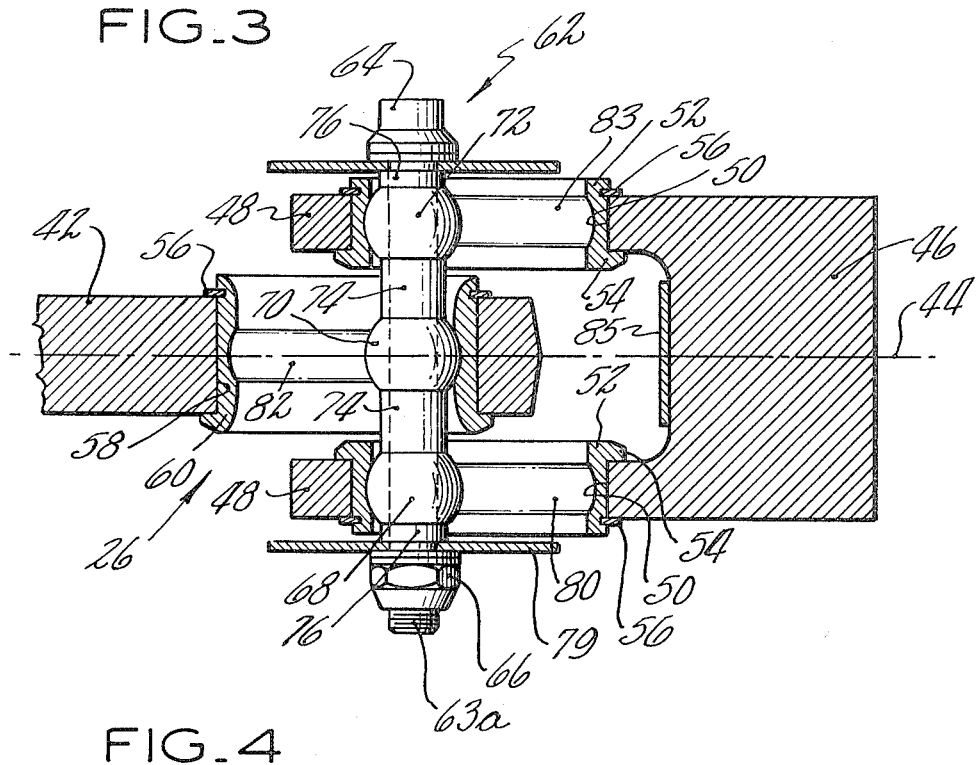

SPHERICAL BIFILAR TUNING PIN BUSHING

The invention herein described was made in the course of or under a contract or sub-contract thereunder, with the Department of the Army.

BACKGROUND OF THE INVENTION

1. Field of the Invention

This invention relates to helicopters in which in-plane vibrations of the rotor result in vibrations in the helicopter fuselage. More particularly this invention relates to improvements in bifilar absorbers connected to the helicopter rotor for rotation therewith in a plane perpendicular to the axis of rotation of the rotor.

2. Description of the Prior Art

In U.S. Pat. No. 3,540,809, issued Nov. 17, 1970 to William F. Paul et al, and assigned to the assignee of this application, a helicopter is shown equipped with bifilar absorbers. The present invention is directed to improvements in the absorbers of the Paul et al patent.

In the patent a bifilar absorber has a pendulous, or counterweight element, connected to its absorber supporting member on the rotor head by tuning pin assemblies which pass through enlarged apertures in the support member and pendulous element and include tuning pins. These tuning pins provide a rolling pendulous and vibration absorbing motion between the pendulous element and its supporting member.

In a bifilar absorber any friction between the pendulous element and its supporting member can completely destroy absorber effectiveness and to prevent face-to-face contact between the sides of the pendulous element and the adjacent sides of its support member it was necessary in the prior patent to provide washers which have tapered side walls between these confronting faces. These washers somewhat reduced the undesirable frictional damping adjacent the tuning pin in normal operation of the absorber. The present invention teaches an improved tuning pin construction which provides centering of the pendulous element of the absorber relative to its support member under the action of centrifugal force and completely eliminates face-to-face sliding contact of relatively movable absorber parts and also eliminates the need for these washers.

SUMMARY OF THE INVENTION

It is a principal object of this invention to produce a bifilar absorber in which the pendulous element of the absorber is maintained centered relative to its support member during rotation of the absorber without frictional damping of its movements due to face-to-face contact between relatively movable absorber parts.

Another object of this invention is to provide a bifilar absorber for use on helicopter rotor heads in which any forces acting on the absorber normal to the centrifugal forces acting on the absorber, for example, forces due to weight, maneuver loads, gyroscopic movements or vertical vibrations are reacted by flapping of the bifilar mass in the vertical plane.

In the bifilar mass of U.S. Pat. No. 3,540,809, large-diameter tracking holes were provided in the pendulous element and in its support member with tuning pin assemblies extended through these holes. Tracking hole inserts were provided in the tracking holes over which tubular, right-cylinder tuning bushings on the tuning pin moved as the counterweight member of the absorber oscillated. In the operation of this prior construction, as the bifilar mass translates relative to its support member the tuning bushings want to roll bodily along the tracking inserts. The friction developed between the beveled washers and the tracking hole inserts opposes the motion of the pendulous mass and also tends to force the tuning bushings to slide rather than roll along the tracking hole inserts. This introduces undesirable friction damping into the absorber. In the present invention improved tuning bushings are provided for a bifilar absorber having spherical surfaces which cooperate with tracking hole inserts having tracking grooves provided with matching arcuate surfaces. Under the action of centrifugal force the oscillating member of the absorber is centered relative to its support member and maintained in spaced relation thereto.

It is, therefore, a further object of this invention to provide a bifilar absorber in which the pendulous element is maintained centered relative to its support member under the action of centrifugal force by means of tuning pins having spherical tuning bushings which cooperate with matching peripheral grooves in the tracking inserts that are arcuate in cross section.

A still further object of this invention is generally to improve bifilar absorbers for the rotors of rotary wing aircraft.

BRIEF DESCRIPTION OF THE DRAWINGS

FIG. 3 is an enlarged view of the absorber of FIG. 2; and

FIG. 4 is a view similar to FIG. 3 of an absorber which is tuned for a higher oscillation per revolution of the rotor.

DESCRIPTION OF THE PREFERRED EMBODIMENT

Figure 1:
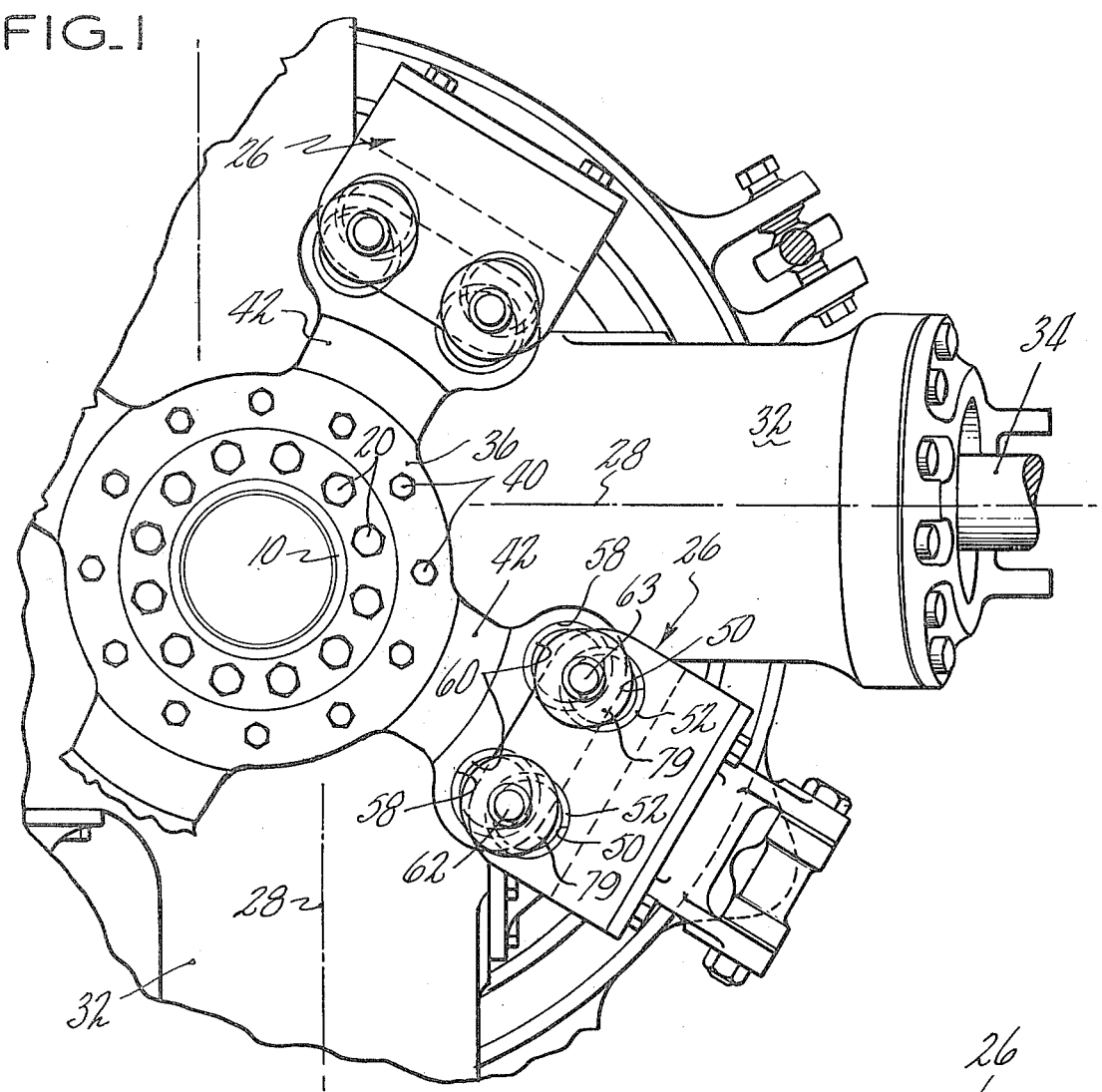
FIG. 1 is a partial plan view of a helicopter rotor equipped with the improved bifilar absorber of this invention.
Figure 2:
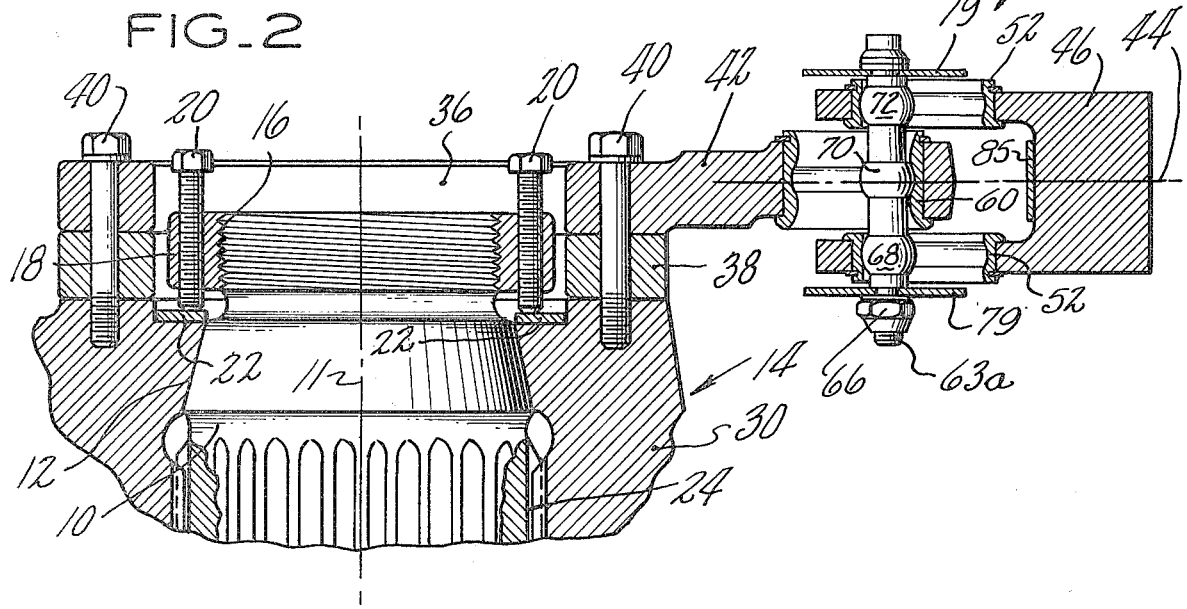
FIG. 2 is an enlarged elevation, partly in section, of the rotor head of FIG. 1, an improved absorber being shown in section.

Referring to FIGS. 1 and 2, 10 indicates an upstanding rotor drive shaft for a helicopter rotor rotatable about axis 11. Shaft 10 has an annular tapered seat 12 on which a rotor head 14 is seated. Shaft 10 also has an upper threaded end 16 on which a nut 18 is threaded. Cap screws 20 are threaded into nut 18 and at their lower ends below the nut abut an annular thrust washer 22 seated on the top surface of rotor head 14. By tightening cap screw 20 rotor head 14 is forced down on tapered seat 12 and secured to drive shaft 10. Splines 24 provided on shaft 10 and on rotor head 14 complete the driving connection between shaft 10 and the rotor head.

A plurality of bifilar absorbers 26 are provided, preferably between radial blade positions 28 indicated in FIG. 1. In the rotor head shown there is a hub 30 (FIG. 2) having a radial housing 32 (FIG. 1) projecting at each blade location 28 which supports a blade spindle 34.

As shown in FIG. 1 the masses are supported above the rotor blades by a spider 36 seated on an annular spacing ring 38 (FIG. 2) on the top of rotor head 14 and held in this position by an annular arrangement of cap screws 40 which pass through the spider and the ring and are threaded into hub 30. Spider 36 has a radially projecting plate-like extension 42 for each absorber 26 which lies in a generally horizontal plane 44 in which the masses oscillate. Extensions 42 compromise the support members for the several masses.

Referring to FIG. 3, it will be noted that each absorber consists of a heavy mass 46, U-shaped in cross section, as shown in elevation, to provide two parallel plate-like arms 48 of considerable length joined by mass 46 with one side plate 48 on each of the top and bottom sides of an absorber support member 42. Mass 46 is the pendulous counterweight element of the absorber. Each arm 48 has two large-diameter tracking holes 50 located side-by-side (FIG. 1) and each hole has a tracking insert 52 held in place by a flange 54 at one end and a snap ring 56 at its other end.

Absorber support member 42 extends into the space between arms 48 and is also provided with two large-diameter tracking holes 58 and tracking inserts 60 similar to those in arms 48. The absorber is held in assembled position by two tuning pin assemblies 62, 63 (FIG. 1) which pass through aligned tracking inserts 52 in arms 48 of mass 46 and tracking insert 60 in absorber support member 42. These assemblies are identical and only assembly 62 shown in FIG. 3 will be described in detail. Tuning pin assembly 62 includes a bolt 63a having a head 64 and a clamping nut 66 between which are mounted the three tuning bushings 68, 70 and 72, spacing sleeves 74 and 76 and two large-diameter washers 79.

In accordance with this invention the tuning bushings 68, 70 and 72 are formed as spheres having diametrically bored holes permitting them to be pressed over pin 63a and held in place axially by spacing sleeves 74 and 76. Depending upon the diameter of these spheres they may be more or less truncated, as shown in FIG. 3. However in this specification and the claims following they will be referred to as spherical tuning bushings and as having spherical surfaces. The large washers 79 which are located so as to lie adjacent and external of arms 48 are provided to prevent the tuning pin assembly from falling out of the absorber when the rotor is stationary and the absorber is not subject to centrifugal force.

The spherical surfaces of the tuning bushings are received in matching, confronting arcuate tracking groves 80, 82 and 83 provided on tracking hole inserts 52 in arms 48 and insert 60 in absorber support member 42. Sleeves 74 which space bushings 68, 70 and 72 and sleeves 76 which space bushings 68, 72 from washers 79 are of such length that they position the spherical surfaces of the tuning bushings in register with the arcuate grooves in the tracking inserts and thus space the arms 48 and their tracking inserts 52 from inserts 60 on support member 42 on one side from washer 79 on the other side, thus preventing face-to-face contact between these relatively movable absorber parts.

The tuning of the absorber is accomplished by varying the diameter of the spherical tuning bushings and, of course, the matching arcuate tracking grooves in the tracking inserts. FIG. 3 shows an absorber tuned for three oscillations per revolution of the rotor. In FIG. 4 an absorber is shown tuned for five oscillations per rotor revolution. It will be noted that in FIG. 4 the tuning spheres 68a, 70a and 72a are larger in diameter and hence by cutting away the right amount on the truncated spheres the spacers 74, 76 of FIG. 3 can be eliminated. The arcuate grooves of the tracking hole inserts 80a, 82a and 83a are changed to match the spherical surfaces of the larger-diameter tuning bushings 68a, 70a and 72a. The same careful spacing between relatively movable absorber parts is maintained as in FIG. 3, thus eliminating friction damping of the pendulous element of the absorber and permitting the tuning pin assemblies to roll freely. A pad 85 in both FIG. 3 and FIG. 4 acts as a bumper to protect the damper parts from damage should contact occur with support arm 42.

In the operation of our improved absorber the pendulous counterweight 46 is extended upon rotation of the rotor into the position shown in FIG. 3 in which the tuning bushings 68, 72 are located on the inboard tracking surfaces 80 and 83 of tracking inserts 52 in arms 48 and bushing 70 is located on the outboard portion of tracking surface 82 of insert 60 in support arm 42. Here it should be recalled that there are two tuning pin assemblies for each absorber counterweight, as is shown in FIG. 1. As the masses are rotated the centrifugal forces acting on the counterweights 46 hold the tuning bushings firmly against the arcuate tracking grooves and in so doing accurately position the oscillating pendulum elements spaced from absorber support members 42, thus insuring that undesirable frictional damping between confronting surfaces of these relatively movable absorber parts does not occur.

FIG. 3 shows the absorber 26 in its normal operative position when it is rotating with the rotor about axis 11 of rotor drive shaft 10. In this condition centrifugal forces have thrown element 46 radially outward along plane 44 and this pendulous element is supported from support member 42 by the two tuning pin assemblies 62, 63 so that a rolling pendulous and vibration absorbing motion is permitted between element 46 and its support member 42 through the rolling action of tuning bushings 68, 70 and 72 on their tracking grooves 80, 82 and 83. Here it should be understood that tuning bushings 68, 70 and 72 are clamped by nut 66 and spacers 74, 76 so they do not rotate on bolt 63a. Rather the rolling motion of the roll pin assembly on the tracking inserts is a bodily rolling movement of these assemblies on the tracking inserts free from contact with any other absorber part.

The arcuately grooved tracking inserts and the spherical tuning bushings which cooperate therewith to center the absorber support member relative to the spaced arms 48 of the pendulous element of the absorber and maintain it out of contact therewith have a further advantage when this improved bifilar absorber is used on a helicopter rotor head. In the prior absorber construction of U.S. Pat. No. 3,540,809 the tubular, right-cylinder tuning bushings did not allow flapping movement i.e. the movement of the bifilar mass in vertical planes at right angles to the horizontal plane 44 in which the absorber rotates. In the improved absorber of this invention, forces normal to plane 44, for example, forces due to weight, maneuver loads, gyroscopic moments or vertical vibrations are reacted by flapping of the bifilar mass about the in-plane axes of tuning bushings 70 which, because they are spherical, permit this flapping motion.

It will be evident from the above description that using spherical tuning bushings and matching arcuately grooved tracking inserts eliminates the former undesirable sliding of the roll pin assemblies on their tracking inserts due to face-to-face frictional engagement between relatively movable absorber parts. Also the use of spherical tuning bushings and the matching grooved tracking inserts makes possible flapping of the pendulous absorber element.

We do not wish to be limited to the exact details of construction shown and described herein as numerous modifications will occur to persons skilled in this art which fall within the scope of the following claims.

We claim:

1. A bifilar absorber for helicopter rotors including a pendulous element, an absorber support member carried by the rotor, said element and said member having sets of matching large-diameter tracking apertures, tracking inserts in said apertures having shallow peripheral grooves which are arcuate in cross section, and a tuning pin assembly extended through each set of matching apertures including an axial pin and a plurality of spherical tuning bushings on said pin in position to cooperate with the grooves of its set of tracking inserts.

2. In a bifilar absorber for helicopter rotors, a pendulous element including a weight and two spaced plate-like arms having large-diameter tracking apertures, an absorber support member carried by the helicopter rotor including a plate-like extension occupying the space between said arms and having tracking apertures matching the apertures in said arms, tracking inserts in the apertures in said arms and said extension having peripheral grooves which are arcuate in cross section, and means for connecting said pendulous member to said support member including a tuning pin assembly extended loosely through each of said matching tracking apertures, each of said assemblies including an axial pin and three spherical tuning bushings arranged in spaced relation along said pin in position to cooperate with the tracking grooves of matching apertures in said element and said extension.

3. A bifilar absorber for helicopter rotors comprising a U-shaped pendulous element including two spaced plate-like arms connected at one of their ends by a weight, and an absorber support member adapted to be supported on a helicopter rotor having a plate-like radial extension which is received closely between the arms of said pendulous element, said arms and said extension having substantially annular apertures of large diameter in substantial alignment, tracking inserts in said apertures having peripheral grooves arcuate in cross section, and means for supporting said pendulous element on said absorber support member with said extension accurately centered and out of contact with said arms during rotation of the absorber comprising a tuning pin assembly extended loosely through aligned apertures in said element and member, said assembly including an axial bolt having three spherical bushings fixed thereon in position to cooperate with the three arcuate grooves in said aligned tracking inserts in said arms and said member.

4. A bifilar absorber for helicopter rotors comprising a U-shaped pendulous element including two plate-like arms and a weight connecting said arms at one of their ends, said arms having aligned large-diameter apertures adjacent their free ends, an absorber support member adapted to be mounted on the helicopter rotor including a plate-like radial extension which lies between the arms of said pendulous element, said extension having large-diameter apertures therein axially aligned with the apertures in said arms, tracking inserts in the apertures in said arms and said extension having shallow peripheral grooves therein arcuate in cross section, and means for supporting said pendulous element in centered position on said support member with its arms accurately spaced from the extension on said support member during rotation of the absorber including a tuning pin assembly loosely extended through each set of aligned apertures in said element and member, each of said assemblies including an axial bolt having three spherical tuning bushings fixed thereon in position to engage the grooves in said tracking inserts of aligned apertures in said arms and said extension.

5. The absorber of claim 4 in which each tuning pin assembly has a washer which is larger than the apertures in said arms at each end of its bolt located externally of the arms of said pendulous element.

6. A bifilar absorber for helicopter rotors comprising a U-shaped pendulous element having two spaced parallel plate-like arms and a weight connecting said arms at one of their ends, said arms having two side-by-side substantially annular apertures of large diameter in their free ends, an absorber support member adapted to be carried by a helicopter rotor having a plate-like radial extension which is closely received between the arms of said U-shaped element, said extension having two side-by-side substantially annular apertures having their vertical axes parallel and equidistant from the axis of rotation of the rotor and aligned with the axes of said apertures in said U-shaped element, annular tracking inserts in said apertures in said U-shaped element and said extension having shallow annular grooves in their peripheries which are arcuate in cross section, and a tuning pin assembly loosely extended through each set of aligned apertures in said element and member including a bolt having three spherical tuning bushings supported in spaced relation thereon in position to roll in the grooves in said aligned tracking inserts in said arms and in said support member extension.

7. A bifilar absorber for helicopter rotors comprising a pendulous element including a weight having two spaced plate-like arms, an absorber support member carried by the rotor having a plate-like extension occupying the space between said arms, said arms and said extensions having a plurality of sets of matching large-diameter tracking apertures, tracking inserts in said apertures having peripheral grooves therein which are arcuate in cross section, and means for connecting said element and member comprising tuning pin assemblies loosely extended through matching sets of apertures in said arms and said extension, said assemblies each including an axial pin carrying three spherical tuning bushings which cooperate with the tracking grooves in a set of matching apertures.

8. A bifilar absorber for helicopter rotors comprising a plate-like absorber support member carried by the rotor and rotatable therewith in a plane about the axis of rotation of the rotor, said member having two apertures of substantial circular cross section therein the axes of which are parallel with and equidistant from said rotor axis, an annular tracking insert in each of said apertures having a shallow tracking groove on its inner surface which is arcuate in cross section, a bifilar mass of generally U-shape having parallel plate-like arms between which said support member extends, said arms each having two apertures of substantially circular cross section matching in position the apertures in said support member, each aperture in said arms provided with a tracking insert having a shallow groove in its inner surface which is arcuate in cross section, and two tuning pin assemblies extended through the matching apertures in said support member and said arms, each having three spherical tuning bushings positioned thereon to roll along the three associated arcuately grooved tracking inserts of said arms and said extension.

9. A bifilar absorber for helicopter rotors comprising a plate-like absorber support member carried by the rotor head and rotatable therewith in a plane about the axis of rotation of the rotor, said member having two apertures of substantially circular cross section therein having axes which are parallel with and equidistant from said rotor axis, a substantially annular tracking insert in each of said apertures, a bifilar mass of generally U-shape having parallel plate-like arms between which said support member is closely received in face-to-face confrontation, said arms each having two apertures therein of substantially circular cross section matching in position the apertures in said support member, each aperture in each arm having a tracking insert therein, a tuning pin assembly extended axially through each set of aligned apertures in said support member and arms, each having tuning bushings thereon spaced to register with the tracking inserts on said support member and arms, means for centering said bifilar mass relative to said support member under the action of centrifugal force so the face-to-face surfaces of said relatively movable absorber parts are maintained out of contact during oscillatory movements of said bifilar mass, said centering means including tracking grooves in the faces of said tracking inserts which are arcuate in cross section and spherical surfaces on the bushings on said tuning pin assemblies which roll along the arcuate tracking grooves in said tracking inserts.

10. A bifilar absorber for helicopter rotors comprising a plate-like absorber support member carried by the rotor and rotatable therewith in a plane about the axis of rotation of the rotor, said member having two apertures of substantially circular cross section therein having axes which are parallel with and equidistant from the rotor axis, a substantially annular tracking insert in each of said apertures, a bifilar mass of generally U-shape having parallel plate-like arms between which said support member is closely received in face-to-face confrontation, said arms each having two apertures therein of substantially circular cross section matching in position the apertures in said support member, each aperture in each arm having a tracking insert therein, a tuning pin assembly extended loosely through each set of aligned apertures in said support member and arms, means for centering said bifilar mass relative to said support member under the action of centrifugal force so that face-to-face surfaces of said relatively movable absorber parts are maintained out of contact during oscillatory movements of said bifilar mass, said centering means including peripheral tracking grooves arcuate in cross section in the faces of said tracking inserts and spherical tuning bushings having matching arcuate surfaces on said tuning pin assemblies which roll bodily along said arcuate grooves in said tracking inserts.

11. In a bifilar absorber for a helicopter rotor including an absorber support member adapted to be carried by and rotatable with the rotor, a pendulous element including a weight and two spaced arms extended from said weight between which said support member is closely received, said member and said arms having sets of large-diameter apertures, tracking inserts in each of said apertures, each having a peripheral groove arcuate in cross section, and means for connecting said pendulous element to said support member comprising a tuning pin assembly loosely extended through each set of tracking apertures having a spherical tuning bushing for each grooved tracking insert in each set of apertures the spherical surfaces of which match the arcuate surfaces of said grooves.

12. A bifilar absorber for a helicopter rotor comprising an absorber support member carried by the rotor and a pendulous element mounted on said support member, said element and said member having matching sets of tracking apertures with tracking inserts in said apertures, a tuning pin extending through each set of apertures having spherical tuning bushings fixed in spaced relation thereon to cooperate with said tracking inserts, said inserts having peripheral grooves arcuate in cross section which match the spherical surfaces of said bushings in which the latter roll during oscillatory movements of said pendulous element.

13. A bifilar absorber for a helicopter rotor comprising an absorber support member carried by the rotor including a radial extension having two side-by-side tracking apertures therein of substantial diameter the vertical axes of which are parallel with the axis of rotation of the rotor and equidistant therefrom, a pendulous element mounted on said extension including a weight having two spaced parallel arms between which said extension is closely received, each of said arms having two side-by-side tracking apertures which are aligned with the apertures in said extension, tracking inserts in each of said apertures in said extension and said arms each having therein a peripheral groove arcuate in cross section, tuning pins for supporting said pendulous element on said extension against centrifugal force including two spherical tuning bushings on each of said tuning pins fixed in position thereon to register with the tracking grooves in said arms, and a single centrally located spherical tuning bushing on each tuning pin fixed thereon to register with the single tracking grooves in said extension, said single spherical bushings providing means for permitting vertical flapping movements of said pendulous element of the absorber.

* * * * *